Dec. 6, 1938.  S. W. WILSON  2,139,612
HEATER FOR AUTOMOBILES
Filed Feb. 1, 1938
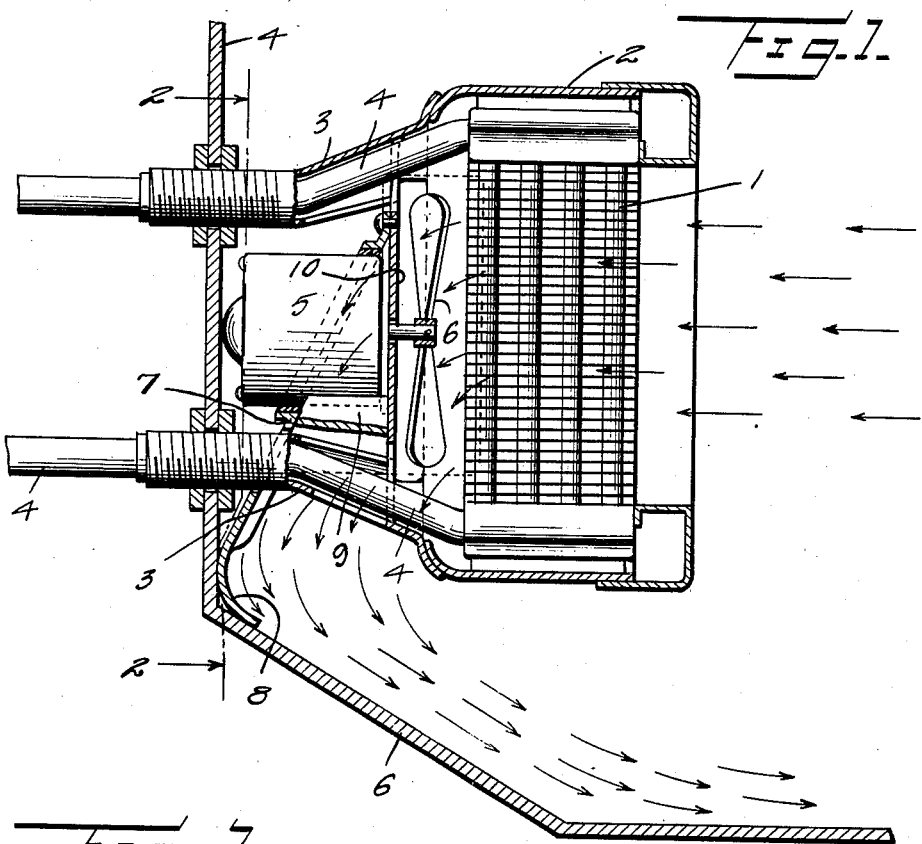
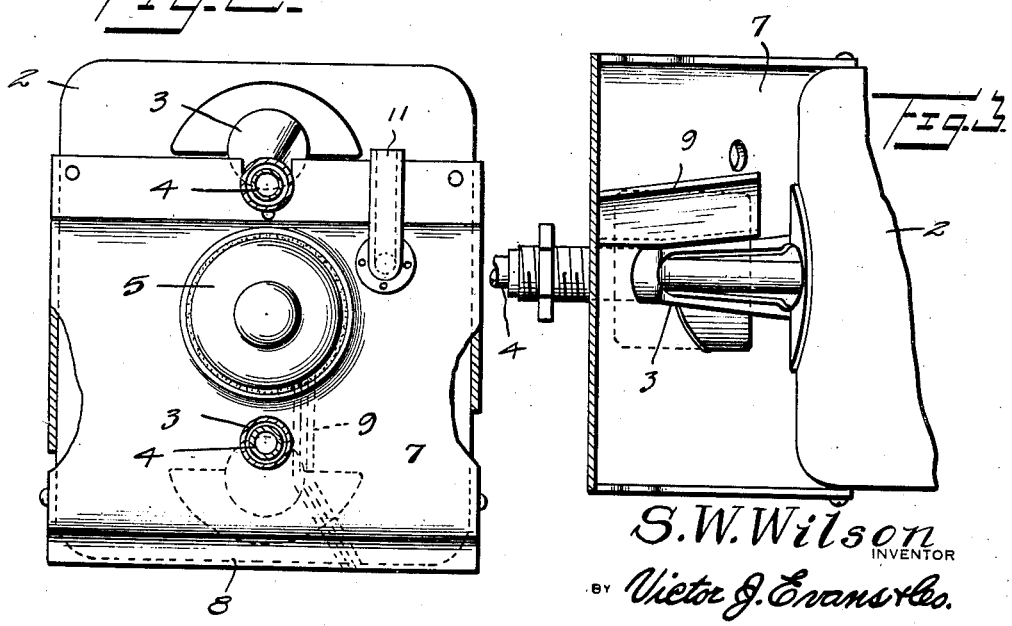
S. W. Wilson
INVENTOR
BY Victor J. Evans & Co.
ATTORNEYS Patented Dec. 6, 1938

2,139,612

UNITED STATES PATENT OFFICE 2,139,612

HEATER FOR AUTOMOBILES

Savannah W. Wilson, Johnstown, Pa.

Application February 1, 1938, Serial No. 188,162

2 Claims. (Cl. 257—137)

This invention relates to heaters for automobiles and has for the primary object the provision of a device of this character which will provide an improved air circulation wherein the air will be efficiently heated and directed to and over the floor boards of the automobile so that the heated air rising therefrom about the occupants of the automobile will keep the feet and legs as well as the remaining portions of the occupants warm and thereby eliminate the direct discharge of heated air against the bodies of the occupants of the automobile and never in contact with the floor boards, the coldest part of the automobile body, as with the conventional type of heater.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view showing a heater adapted to a portion of an automobile body and constructed in accordance with my invention.

Figure 2 is a sectional view taken on line 2—2 of Figure 1.

Figure 3 is a fragmentary bottom plan view illustrating the heater.

It has been the customary practice in heaters to force air through a core with the heated air escaping from the front of the heater which will be some distance above the floor boards of the automobile body and directly against the bodies of the occupants of the automobile, leaving the feet and legs of the occupants unheated and never heating the air over the floor boards of the automobile where the air is the coldest. The present inventtion has for its purpose to reverse the flow of air over the conventional type of heater with respect to the core of the heater and to discharge said heated air in such a way that it will contact with and move over the floor boards of the automobile body and gradually ascend to assure complete warming of the occupants. The present invention is similarly constructed to a conventional type of heater, that is, it employs a core, 1, mounted in a casing 2, the latter having attaching arms 3 through which the leads 4 of the core extend. The attaching arms are mounted in openings provided in the front partition 4' of the automobile body. The core and its casing are supported a proper distance above the floor.

Located in the casing 2 is an electric motor 5 for driving a suction type fan 6. The fan 6 draws air through the core 1 by way of the front of the casing. Mounted in the rear portion of the casing 2 is a deflector 7 having an opening to receive the electric motor 5 and extends downwardly away from said casing and terminates in a curved portion 8 which contacts the floor boards and the partition 4' so that the air heated by the core and drawn through said core by the fan will be discharged downwardly against the floor boards to move over said floor boards in the direction indicated by the arrows. Heated air always has a natural tendency to rise and as the velocity of the heated air from the fan substantially decreases its movement over the floor boards will rise of its own accord and thoroughly and efficiently heat the feet and legs as well as the other portions of the occupants of the automobile. The heated air being first directed over the floor boards will eliminate cold drafts from the bottom of the automobile body. An auxiliary deflector 9 is carried by the deflector 7 and extends at substantially right angles thereto for the purpose of dividing the discharge of the heated air so that the heated air will be distributed evenly to opposite sides of the automobile body. The support for the electric motor is indicated by the character 10 and its width is of the minimum so as not to unduly obstruct the flow of the heated air from the fan.

An L-shaped pipe 11 is secured on the rear wall of the housing 2 to receive a portion of the heated air from the radiator and may have connected thereto the usual windshield defroster (not shown).

What is claimed is:

1. A heater for automobiles comprising, a hollow casing having an air inlet opening at the front thereof, a heat exchange unit in said casing covering the air inlet opening of the casing, the casing having an outlet opening at the rear thereof, an inclined deflector covering the outlet of the casing, said deflector extending rearwardly and downwardly, the lower end portion of said deflector terminating in a plane below the casing and being curved forwardly and adapted to rest tangentially on the inclined portion of the floor board and abutting the adjacent front partition of the vehicle body, a motor received in an opening provided therefor in said inclined deflector, a relatively narrow supporting element for the motor within said casing, and a fan driven by said motor and located within the casing between the motor support and said heat exchange unit.

2. A heater for automobiles comprising, a hollow casing having an air inlet opening at the front thereof, a heat exchange unit in said casing covering the air inlet opening of the casing, the casing having an outlet opening at the rear thereof, an inclined deflector covering the outlet of the casing, said deflector extending rearwardly and downwardly, the lower end portion of said deflector terminating in a plane below the casing and being curved forwardly and adapted to rest tangentially on the inclined portion of the floor board and abutting the adjacent front partition of the vehicle body, a motor received in an opening provided therefor in said inclined deflector, a relatively narrow supporting element for the motor within said casing, and an auxiliary deflector disposed at right angles to said inclined deflector and extending below the motor whereby to divide and direct the downward flow of air from the casing outlet to opposite sides of the vehicle body.

SAVANNAH W. WILSON.